(12) United States Patent
Gardner et al.

(10) Patent No.: US 7,646,538 B2
(45) Date of Patent: Jan. 12, 2010

(54) METHODS AND APPARATUS FOR CREATING APERTURES THROUGH MICROLENS ARRAYS USING CURVED CRADLES

(75) Inventors: Richard N. Gardner, Raleigh, NC (US); John W. Wilson, Durham, NC (US); Brian C. Cox, Durham, NC (US); Reese A. Jernigan, Raleigh, NC (US); David L. Reed, Chapel Hill, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 46 days.

(21) Appl. No.: 12/119,672

(22) Filed: May 13, 2008

(65) Prior Publication Data
US 2008/0252983 A1 Oct. 16, 2008

Related U.S. Application Data

(62) Division of application No. 11/538,910, filed on Oct. 5, 2006, now abandoned.

(51) Int. Cl.
*G02B 27/10* (2006.01)
*G02B 26/08* (2006.01)
*G02B 9/00* (2006.01)
*G02B 1/12* (2006.01)
*A47G 29/00* (2006.01)

(52) U.S. Cl. .................... 359/619; 359/217.1; 359/738; 264/1.37; 248/683

(58) Field of Classification Search .................. 248/683; 264/1.37; 355/117; 359/217.1, 454, 455, 359/619, 626, 738; 430/321
See application file for complete search history.

(56) References Cited

U.S. PATENT DOCUMENTS

| 4,172,219 | A | 10/1979 | Deml et al. |
| 4,666,248 | A | 5/1987 | van de Ven |
| 6,242,140 | B1 | 6/2001 | Kwon et al. |
| 6,633,351 | B2 | 10/2003 | Hira et al. |
| 6,788,460 | B2 | 9/2004 | Knox et al. |

(Continued)

FOREIGN PATENT DOCUMENTS

JP 9-35668 A 2/1997

OTHER PUBLICATIONS

Notification of Transmittal of the International Search Report and the Written Opinion of the International Searching Authority, or the Declaration; International Search Report; Written Opinion of the International Searching Authority, PCT/US2007/021131, Jul. 31, 2008.

(Continued)

*Primary Examiner*—David N Spector
(74) *Attorney, Agent, or Firm*—Myers Bigel Sibley & Sajovec, P.A.

(57) ABSTRACT

Methods for creating apertures in a layer on a back side of a substrate that includes a microlens array on a front side thereof include curving the substrate into a cylindrical surface segment that defines an axis, so that the microlens array on the front side of the substrate faces the axis. A pulsed laser beam is scanned from the axis circumferentially along the cylindrical surface segment, to pass through the microlens array on the front side of the substrate and into the layer on the back side of the substrate to create the apertures, while simultaneously translating the substrate and/or the scanned pulsed laser beam axially relative to one another. Related apparatus and microlens array products are also disclosed.

34 Claims, 5 Drawing Sheets

U.S. PATENT DOCUMENTS

| | | |
|---|---|---|
| 6,816,306 B2 | 11/2004 | Freese et al. |
| 6,829,087 B2 | 12/2004 | Freese et al. |
| 6,967,779 B2 | 11/2005 | Fadel et al. |
| 6,970,288 B2 | 11/2005 | Ebina et al. |
| 7,092,166 B1 | 8/2006 | Wood |
| 7,317,577 B2 * | 1/2008 | Ali et al. .................... 359/619 |
| 7,394,594 B2 * | 7/2008 | Gardner et al. ............. 359/619 |
| 2003/0206342 A1 | 11/2003 | Reed et al. |
| 2004/0004770 A1 | 1/2004 | Ebina et al. |
| 2004/0017612 A1 | 1/2004 | Fadel et al. |
| 2005/0058947 A1 | 3/2005 | Rinehart et al. |
| 2005/0058948 A1 | 3/2005 | Freese et al. |
| 2005/0058949 A1 | 3/2005 | Wood et al. |
| 2005/0225501 A1 | 10/2005 | Srinivasan et al. |
| 2006/0061869 A1 | 3/2006 | Fadel et al. |
| 2006/0139758 A1 | 6/2006 | Segawa et al. |
| 2006/0164729 A1 | 7/2006 | Wood |
| 2007/0258149 A1 | 11/2007 | Gardner et al. |

OTHER PUBLICATIONS

Invitation to Pay Additional Fees, Communication Relating to the Results of the Partial International Search, PCT/US2007/021131, May 23, 2008.
U.S. Appl. No. 11/465,373, filed Aug. 17, 2006, Wood et al.
U.S. Appl. No. 11/465,358, filed Aug. 17, 2006, Wood et al.
U.S. Appl. No. 11/465,377, filed Aug. 17, 2006, Rinehart et al.
U.S. Appl. No. 11/414,875, filed May 01, 2006, Wood.
U.S. Appl. No. 11/378,189, filed Mar. 17, 2006, Wood et al.
U.S. Appl. No. 11/364,423, filed Feb. 28, 2006, Wood.
U.S. Appl. No. 11/179,162, filed Jul. 12, 2005, Wood.
U.S. Appl. No. 11/113,846, filed Apr. 25, 2005, Wood.

* cited by examiner

METHODS AND APPARATUS FOR CREATING APERTURES THROUGH MICROLENS ARRAYS USING CURVED CRADLES

CROSS-REFERENCE TO RELATED APPLICATION

This application is a divisional of application Ser. No. 11/538,910, filed Oct. 5, 2006, now abandoned, entitled Methods and Apparatus for Creating Apertures Through Microlens Arrays Using Curved Cradles, and Products Produced Thereby, assigned to the assignee of the present application, the disclosure of which is hereby incorporated herein by reference in its entirety as if set forth fully herein.

FIELD OF THE INVENTION

This invention relates to microfabricating methods, apparatus and devices so fabricated, and more particularly to methods and apparatus for fabricating optical films containing microstructures and optical microstructures fabricated thereby.

BACKGROUND OF THE INVENTION

Substrates having a microlens array on one side thereof and an array of self-aligned apertures on the other side thereof, are widely used as optical components in computer displays (monitors), projection televisions, flat panel displays and televisions, and many other optical applications. As is well known to those having skill in the art, a microlens array includes a large number of microlenses, at least one dimension of a base of which (a "base dimension") is less than about 500 μm in size. Hemispherical, anamorphic, lenticular and/or other conventional microlens arrays may be formed. The self-aligned apertures may be created in a layer, such as an opaque and/or reflective layer, by impinging a laser through the microlenses onto the layer.

For example, U.S. Pat. No. 4,172,219 to Deml et al., entitled Daylight Projection Screen and Method and Apparatus for Making the Same, issued Oct. 23, 1979, describes such a technique for forming self-aligned apertures. As noted in the Abstract of Deml et al., a layer of material which absorbs incident focused laser light and undergoes a resultant heating is arranged in the focal plane of a lens matrix. Laser light is projected onto such layer through the lens matrix itself. The laser light is focused by the lens elements of the lens matrix onto the layer effecting a highly localized heating of small well-defined portions of the layer. At those small well-defined portions, the material of the layer, as a result of the highly localized heating, removes itself to form the apertures of a lens-aperture matrix which is thereafter used in cooperation with the lens matrix as a rear projection or daylight projection screen.

Another technique for creating self-aligned apertures in a layer is described in U.S. Pat. No. 4,666,248 to van de Ven, entitled Rear-Projection Screen, issued May 19, 1987. As noted at Column 3, lines 51-61 of the van de Ven patent, a method of manufacturing a rear-projection screen in accordance with the invention is characterized in that the following steps are carried out in the given sequence: replicating on a first side of a thin transparent foil an anamorphotic lens structure formed in a mould, applying a light-sensitive material to the second side of the transparent foil, exposing the light-sensitive material through the lens structure, developing the light-sensitive material in such a way that non-exposed parts become opaque, and attaching the second side of the foil to a transparent supporting sheet.

Yet other techniques for forming self-aligned apertures are described in U.S. Pat. No. 6,967,779 to Fadel et al., entitled Micro-Lens Array With Precisely Aligned Aperture Mask And Methods Of Producing Same, issued Nov. 22, 2005, and assigned to the assignee of the present application. As noted in the Abstract of the Fadel et al. patent, a micro-lens array with a precisely aligned aperture mask, and a method of forming the same, is provided. The aperture mask is formed by projecting light onto a mask layer using each lenslet in the micro-lens array. The intensity of the light and the mask layer material are chosen so that the light forms apertures in the mask layer via a non-ablative process. The resulting apertures are automatically aligned with their respective lenslets.

Despite the disclosure of self-aligned aperture formation techniques using a laser beam in the Deml et al. patent over 25 years ago, commercial use of laser beams to create self-aligned apertures through a microlens array do not appear to be widespread. In particular, since a laser produces a relatively small beam of light, aperture creation processes for large substrates, such as substrates having at least one dimension that is about 30" or more, and/or for continuous processing of webs, may provide low throughput. Moreover, it may be difficult to control the laser beam as it scans the array, which may result in misalignment of the apertures relative to the microlenses. Misaligned apertures may, in turn, create variation in transmission leading to unacceptable visible defects when the substrates are used in optical applications.

SUMMARY OF THE INVENTION

Some embodiments of the invention provide apparatus for creating apertures in a layer on a back side of the substrate that includes a microlens array on a front side thereof. These apparatus comprise a cradle including a cylindrical surface segment that defines an axis. The cylindrical surface segment is configured to hold the layer on the back side of the substrate, so that the microlens array on the front side of the substrate faces the axis. A scanning mirror is provided. A pulsed laser is configured to impinge a pulsed laser beam on the scanning mirror. The scanning mirror is oriented relative to the cradle, to scan the pulsed laser beam that impinges thereon, from the axis circumferentially along the cylindrical surface segment, to pass through the microlens array on the front side of the substrate and into the layer on the back side of the substrate to create the apertures. A linear translator is configured to linearly translate the cradle and/or the scanning mirror axially relative to one another, so as to axially translate the pulsed laser beam that is scanned circumferentially along the cylindrical surface segment. A controller may be configured to simultaneously control pulsing of the pulsed laser, scanning of the scanning mirror and translating of the translator.

In some embodiments, the scanning mirror comprises a rotating polygon mirror that is configured to rotate about an axis of rotation that is parallel to the axis of the cylindrical surface segment. In some embodiments, the rotating polygon mirror is positioned relative to the axis of the cylindrical surface segment such that the pulsed laser beam impinges on the polygon surface of the mirror at the axis of the cylindrical surface segment. Moreover, in some embodiments, the scanning mirror is oriented relative to the cradle to scan the pulsed laser beam from the axis circumferentially along, and normal to, the cylindrical surface segment. In other embodiments, the scanning mirror is oriented relative to the cradle to scan the pulsed laser beam from the axis circumferentially along the cylindrical surface segment, with a deviation from normal to the cylindrical surface segment that is less than about 0.01°. Moreover, in some embodiments, movable mirrors, such as fast-steering mirrors, may be employed to at least partially compensate for imperfections in the rotating polygon mirror and/or in the rotation thereof about its axis of rotation. The linear translator may comprise a screw drive that is configured to translate the scanning mirror axially relative to the cradle.

In some embodiments of the invention, the cylindrical surface segment comprises a rigid support layer including perforations therein, a flexible porous buffer layer on the rigid support layer, between the rigid support layer and the axis, and a flexible porous support layer on the flexible porous buffer layer, between the flexible porous buffer layer and the axis. The flexible porous support layer may be configured to support the back side of the substrate and the cradle may further comprise a vacuum plenum that is configured to pull vacuum through the perforations in the flexible porous support layer, through the flexible porous buffer layer and through the rigid support layer, to hold the back side of the substrate on the flexible porous support layer.

In other embodiments, the cylindrical surface segment may comprise a perforated metal sheet, a foam layer on the perforated metal sheet, between the perforated metal sheet and the axis, and a flexible screen on the foam layer, between the foam layer and the axis. The flexible screen may be configured to support a substrate and the cradle may further comprise a vacuum plenum that is configured to pull vacuum through the flexible screen, through the foam layer and through the perforations in the perforated metal sheet, to hold the back side of the substrate on the screen.

In some embodiments, the microlenses may be less than about 100 µm in size at bases thereof and the pulsed laser beam may be about 1 mm in diameter at the cylindrical surface segment. The pulsed laser, the scanning mirror and the linear translator may be configured and controlled so as to overlap impingement areas of the pulsed laser beam on the cylindrical surface circumferentially and axially. Moreover, in some embodiments, the substrate is configured for visible light applications, and the pulsed laser has a longer wavelength than visible light, for example a pulsed infrared laser.

Other embodiments of the present invention provide methods for creating apertures in a layer on a back side of a substrate that includes a microlens array on a front side thereof. These methods comprise curving the substrate into a cylindrical surface segment that defines an axis, so that the microlens array on the front side of the substrate faces the axis. A pulsed laser beam is scanned from the axis circumferentially along the cylindrical surface segment to pass through the microlens array on the front side of the substrate and into the layer on the back side of the substrate to create the apertures, while simultaneously translating the substrate and/or the scanned pulsed laser beam axially relative to one another. The scanning may take place according to any of the above described embodiments.

Still other embodiments of the present invention provide a cradle for holding a substrate that includes a layer on a back side thereof and a microlens array on a front side thereof, while creating apertures in the layer. The cradle comprises a cylindrical surface segment that defines an axis, wherein the cylindrical surface segment is configured to hold the back side of the substrate so that the microlens array on the front side of the substrate faces the axis. The cradle may be configured according to any of the embodiments that were described above.

Finally, microlens array products according to some embodiments of the present invention may include a substrate and an array of microlenses on a first side of the substrate that extend along at least one direction of the substrate for at least 30". The at least 30" dimension may be based upon the final end product having a dimension of at least 30", or of a continuous web of more than 30" that is manufactured and is then cut into smaller pieces. The microlenses in the array include at least one base dimension that is less than about 500 µm in size. A layer on the second side of the substrate includes an array of apertures that extend along the at least one direction of the substrate for at least 30", wherein a respective aperture is aligned with a respective microlens with a deviation from alignment of less than about 0.5° in some embodiments. In other embodiments, variations of less than about 0.1° may be provided, and in still other embodiment variations as low as 0.05° may be provided.

DETAILED DESCRIPTION

Figure 1:
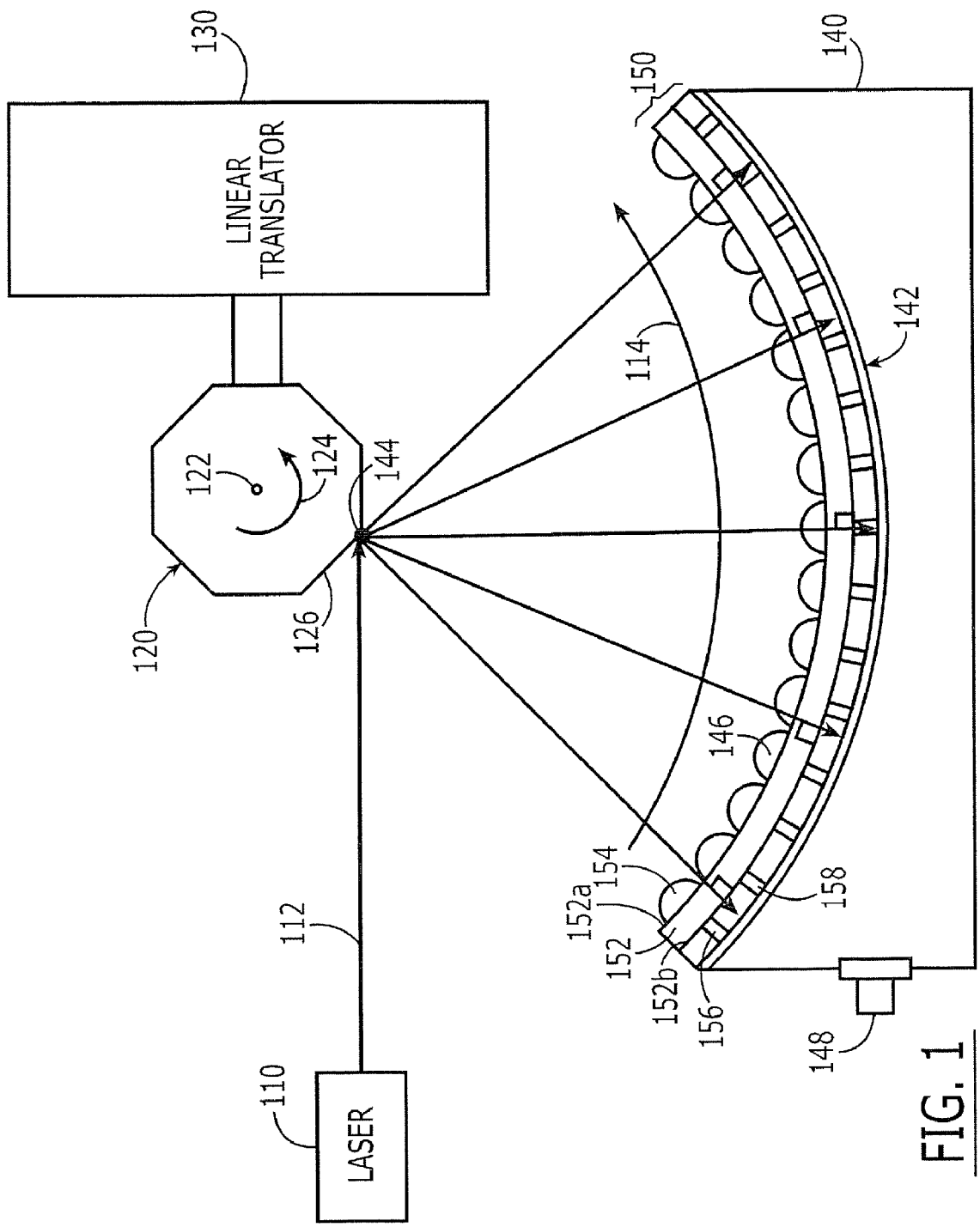
FIG. 1 is a schematic diagram of apparatus and methods for creating apertures in a layer on a back side of a substrate that includes a microlens array on a front side thereof, according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "having," "having," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element (or variations thereof), it can be directly on or extend directly onto the other element or intervening elements may also be present. In contrast, when an element is referred to as being "directly on" or extending "directly onto" another element (or variations thereof), there are no intervening elements present. It will also be understood that when an element is referred to as being "connected" or "coupled" to another element (or variations thereof), it can be directly connected or coupled to the other element or intervening elements may be present. In contrast, when an element is referred to as being "directly connected" or "directly coupled" to another element (or variations thereof), there are no intervening elements present. Finally, when an element is referred to as "holding" another element (or variations thereof), it can directly hold the other element or intervening elements may be present. In contrast, when an element is referred to as "directly holding" another element (or variations thereof), there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. Moreover, the terms "front" and "back" may be used herein to describe opposing outward faces of a display screen. In some embodiments, "front" is used to denote the side of a surface, such as a substrate, first encountered by a pulsed laser beam and "back" is used to denote the opposite side of the surface. Moreover, conventionally, the viewing face may be deemed the front, but the viewing face may also be deemed the back, depending on orientation.

Embodiments of the present invention are described herein with reference to cross section and perspective illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Finally, the functionality of one or more blocks of the figures may be separated and/or combined with that of other blocks.

FIG. 1 is a schematic side view of apparatus/methods of creating apertures using a pulsed laser beam and a curved cradle, according to various embodiments of the present invention. In particular, FIG. 1 illustrates apparatus for creating apertures 158 in a layer 156 on a back side 152b of a substrate 152 that includes a microlens array 154 on a front side 152a thereof. The substrate 152 including a microlens array 154 on the front side 152a thereof and layer 156 with apertures 158 on the back side 152b thereof, may be collectively referred to as a microlens array product or a lens sheet 150. The lens sheet 150 itself may be fabricated as described in U.S. Patent Application Nos. 2006/0061869; 2005/0058947; 2005/0058948; 2005/0058949 and/or 2003/00206342 and/or 2006/0164729; and/or U.S. Pat. Nos. 6,967,779; 6,829,087, 6,816,306 and/or 7,092,166 and/or U.S. application Ser. Nos. 11/113,846; 11/179,162, 11/364,423, 11/378,189, 11/382,163, 11/414,875, 11/465,373, 11/465,358 and/or 11/465,377 all of which are assigned to the assignee of the present invention, the disclosures of which are hereby incorporated herein by reference in their entireties as if set forth fully herein. Other techniques of fabricating the lens sheet 150 also may be used.

The microstructures 154 may include a one- or two-dimensional array of microlenses having at least one base dimension (i.e., a dimension adjacent the substrate 152) that is less than about 500 µm in size. Lenticular, hemispherical, anamorphic and/or other microlens arrays may be provided, depending upon the optical application for the lens sheet 150. The microstructures 154 need not be uniform in size, shape or orientation. As used herein, a "lens" includes any transmissive, diffractive and/or refractive optical element, and a "microlens" includes any transmissive, diffractive and/or refractive optical element having at least one base dimension that is less than about 100 µm.

Continuing with the description of FIG. 1, the apparatus includes a cradle 140 that itself includes a cylindrical surface segment 142 that defines an axis 144. The cylindrical surface segment 142 is configured to hold the layer 156 on the back side of the substrate 152, so that the microlens array 154 on the front side 152a of the substrate 152 faces the axis 144. The dimensions of the cylindrical surface segment 142 may be varied depending on the size of the microlens array product or lens sheet 150 that is being fabricated. For example, in some embodiments, the cylindrical surface segment 142 may define an axis having a radius of about 19.1", may include a circumferential length (in the plane of FIG. 1) of about 30" and an axial length (orthogonal to the plane of FIG. 1) of about 48", to form rear projection screens of about 43"×24". Smaller or larger configurations also may be provided. A vacuum port 148 may also be provided in the cradle 140, to provide a vacuum on the cylindrical surface segment 142 to hold the lens sheet 150 thereon during scanning, as will be described in more detail below.

Still referring to FIG. 1, a scanning mirror 120 is also provided. In some embodiments, the scanning mirror may be an oscillating mirror. However, in other embodiments, as shown in FIG. 1, the scanning mirror 120 comprises a rotating polygon mirror that is configured to rotate about an axis of rotation 122, as shown by arrow 124. In embodiments of FIG. 1, the polygon mirror 120 is an eight-sided polygon mirror. However, fewer (e.g., six) or more (e.g., ten) sides may be provided according to other embodiments of the present invention.

Still referring to FIG. 1, a pulsed laser 110 also is provided. The pulsed laser 110 is configured to impinge a pulsed laser beam 112 on the scanning mirror 120. The pulse rate may be on the order of 100 kHz in some embodiments of the invention. The scanning mirror 120 is oriented relative to the cradle 140, to scan the pulsed laser beam 112 that impinges thereon from the axis 144 circumferentially along the cylindrical surface segment 142, as shown by arrow 114, to pass through the microlens array 154 on the front side 152a of the substrate 152, and into the layer 156 on the back side 152*b* of the substrate 152 to create the apertures 158.

The pulsed laser beam 112 may be generated by a laser 110, such as a pulsed Nd:YAG laser. Moreover, when the lens sheet 150 is used for visible light applications, some embodiments of the invention provide a pulsed infrared (IR) laser 110 that produces a pulsed infrared laser beam 112. In other embodiments, other lasers having a longer wavelength than visible light may be used. By creating apertures using laser beams having a longer wavelength than visible light, improved aperture creation may be provided, as will be described in detail below, compared to conventional applications that use ultraviolet (UV) lasers or other lasers having shorter wavelengths than visible light.

Finally, referring to FIG. 1, a linear translator 130, such as a screw drive and/or other conventional linear translator, is configured to linearly translate the cradle 140 and/or the scanning mirror 120 axially (i.e., into and out of the plane of FIG. 1) relative to one another, so as to axially translate the pulsed laser beam that is scanned circumferentially along the cylindrical surface segment 142. In embodiments of FIG. 1, the linear translator 130 translates the rotating mirror axially (i.e., parallel to the axis 144). In other embodiments, the cradle 140 itself may be translated. In still other embodiments, the cradle 140 and the scanning mirror 120 both may be translated.

Additional discussion of embodiments of FIG. 1 will now be provided. In particular, the scanning mirror 120 may comprise a rotating polygon mirror, as illustrated in FIG. 1, that is configured to rotate about an axis of rotation 122 that is parallel to the axis 144 of the cylindrical surface segment 142. Moreover, as illustrated in FIG. 1, in some embodiments, the rotating polygon mirror 120 is positioned relative to the axis 144 of the cylindrical surface segment 142, such that the pulsed laser beam 112 impinges on the polygon surface 126 of the mirror 120 at the axis 144 of the cylindrical surface segment 142.

As also shown in FIG. 1, by providing a cylindrical surface segment 142, the scanning mirror 120 may be oriented relative to the cradle 140, to scan the pulsed laser beam from the axis 144 circumferentially along the cylindrical surface segment, as shown by arrow 114, while remaining substantially normal (orthogonal) to the cylindrical surface segment. In particular, as shown by the right angle symbols (⏐), the pulsed laser beam 112 may be scanned from the axis 144 circumferentially along the cylindrical surface segment 142, while remaining substantially normal thereto throughout the entire scan. In some embodiments, a deviation from normal that is less than about 30 arc-seconds or less than about 0.01°, may be provided along the entire circumferential scan of the cylindrical surface segment. This deviation may be measured by retroflection and/or other conventional techniques. By providing substantially orthogonal impingement of the pulsed laser beam 112 into the lens sheet 150, the apertures 158 may be formed that are substantially aligned with the lenses 154. More uniform microlens array products may thereby be provided.

In some embodiments, the cylindrical surface segment 142 may have a slot therein that extends circumferentially along the cylindrical surface segment 142 along the arc that is created by the pulsed laser beam 112 as it impinges on the cylindrical surface segment 142. The slot in the cylindrical surface segment 142 can allow the back side of the layer 156 to be exposed to the interior of the cradle 140, so that debris from the aperture creation process may be exhausted from the cradle 140, for example through the vacuum port 148.

FIG. 1 also illustrates methods of creating apertures 158 in a layer 156 on a back side 152*b* of a substrate 152 that includes a microlens array 154 on a front side 152*a* thereof. As illustrated in FIG. 1, these methods may include curving the substrate 152 into a cylindrical surface segment that defines an axis 144, so that the microlens array 154 on the front side 152*a* of the substrate 152 faces the axis 144. A pulsed laser beam 112 is scanned from the axis 144 circumferentially along the cylindrical surface segment 142, as shown by arrow 114, to pass through the microlens array 154 on the front side 152*a* of the substrate 152 and into the layer 156 on the back side 152*b* of the substrate 152, while simultaneously translating the substrate 152 and/or the scanned pulsed laser beam 112 axially (into and out of the plane of FIG. 1) relative to the one another.

FIG. 1 also illustrates microlens array products 150 that may be produced according to various embodiments of the present invention. These microlens array products 150 may include a substrate 152 that extends for at least 30" along one direction thereof (length, width and/or diagonal). The substrate may be at least 30" long along one direction thereof, because the substrate is an end product that is used to form a 30" diagonal or larger screen. Alternatively, the substrate 152 may extend for at least 30" along one direction thereof, because the substrate 152 is a continuous substrate (web) that is later cut to form individual microlens array products. In any event, an array of microlenses 154 is provided on the first side 152*a* of the substrate 152. The microlenses 154 also extend at least along one direction of the substrate (length, width and/or diagonal) for at least 30". The microlenses 154 include at least one base dimension that is less than about 500 μm in size. A layer 156, such as a black layer, is provided on the second side 152*b* of the substrate 152, having an array of apertures 158 therein that also extend along at least one direction of the substrate (length, width and/or diagonal) for at least 30".

In some embodiments, a respective aperture 158 is aligned with a respective microlens 154 in the array with a deviation from alignment of less than about 0.5°, where the deviation from alignment is measured relative to an orthogonal light ray passing through the axis of the microlenses 154, as illustrated in FIG. 1. In other embodiments, deviation from alignment of less than 0.1° may be provided, and in some embodiments deviation from alignment of less than about 0.05° may be provided.

In particular, in some embodiments, the amount of permissible misalignment to reduce or avoid visible defects may be a function of the uniformity in the misalignment. If there is a shift in the way the apertures are aligned from one portion of the substrate to the next, different transmission patterns may be visible, and the microlens array product may not visibly appear to be uniform. For example, it may darker in one location than in others, or may show light and dark patches when viewed at an angle. Random variations that are less than 0.1° may lead to no visible imperfections. However, if the variations are not random, but, rather, drift in one direction or another, or if they repeat, then the accuracy may need to be better, and it may be desired to maintain an accuracy of 0.05° or less to avoid visible artifacts. In any event, large area microlens array products 150 may thereby be provided with apertures that are sufficiently aligned to the microlenses throughout the product 150, so as to reduce or avoid visible imperfections.

Figure 2:
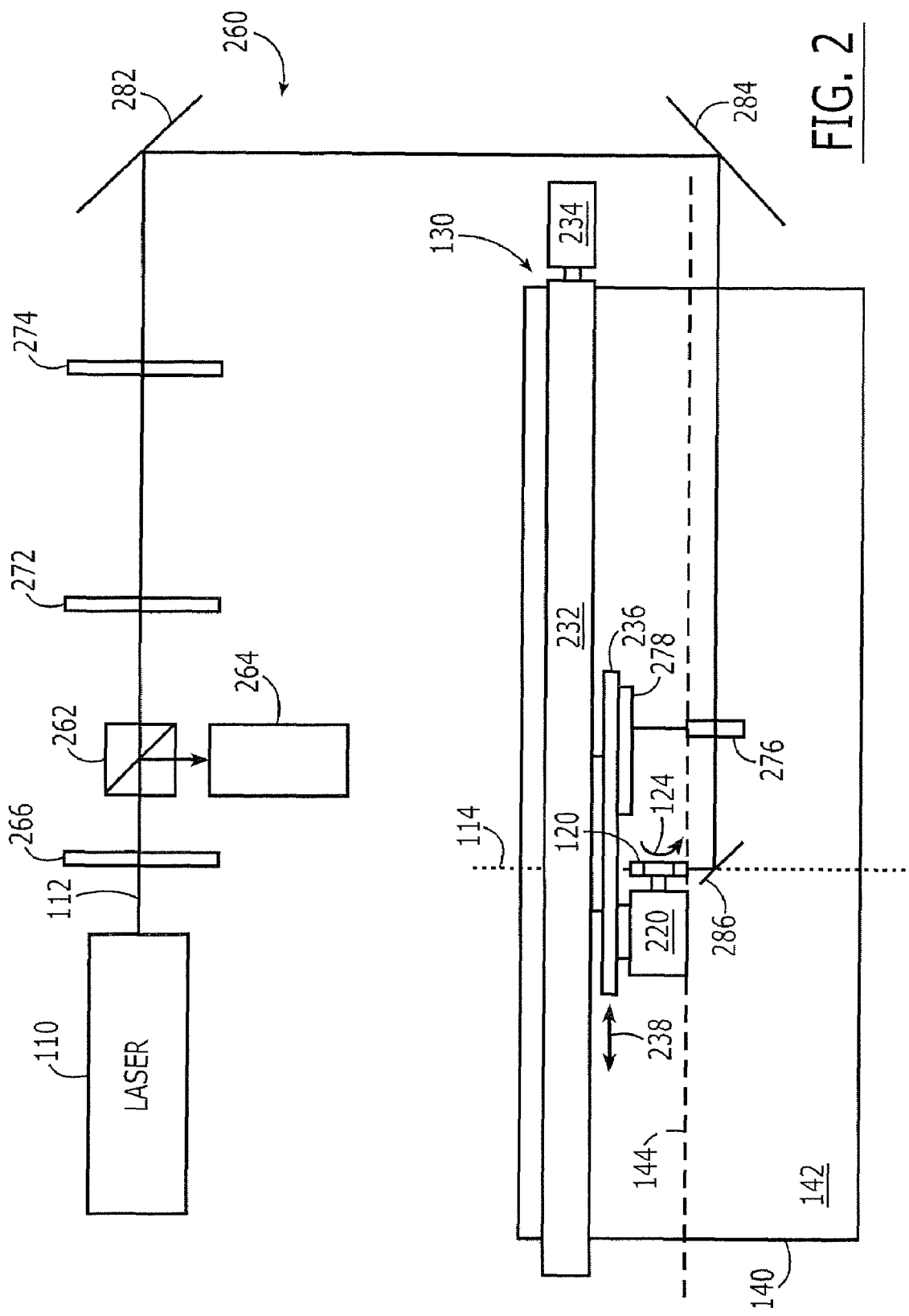
FIG. 2 is a schematic diagram of apparatus and methods for creating apertures in a layer on a back side of a substrate that includes a microlens array on a front side thereof, according to other embodiments of the present invention.

FIG. 2 is a schematic top view of apparatus and methods for creating apertures according to other embodiments of the present invention. In FIG. 2, the linear translator 130 is embodied as a screw drive 232 that is driven by a screw drive motor 234 and moves a slide 236 in an axial direction shown by arrow 238. A scanning mirror motor 220 also may be provided to rotate the polygon mirror 120 in a direction shown by arrow 124. As was described in connection with FIG. 1, a slot may be provided in the cylindrical surface segment 142 at a location shown by the line 114. The laser 110 may be positioned as shown in FIG. 2, and an optical train 260 may be used to condition the pulsed laser beam 112 and to convey the pulsed laser beam to the polygon mirror 120.

In embodiments of FIG. 2, the optical train 260 may include a quarter wave plate 266, a beam splitter 262 and a beam detector 264, first and second beam expanding and collimating lenses 272, 274, a focusing lens 276 and three beam steering mirrors 282, 284, 286. The beam splitter 262 and beam detector 264 may be used to sample and monitor the power and/or pulses of the laser beam 112. In some embodiments, the first lens 272 may have a focal length of about −100 mm and the second lens 274 may have a focal length of about 400 mm. Moreover, the first and second lenses 272 and 274 may be spaced apart by about 300 mm. The focusing lens 276 may be mounted on a focusing lens slide 278 that may be adjustable relative to the linear translator slide 236, to provide fine focusing before a given run. The optical train 260 may convey the pulsed laser beam that has a diameter of about 1.3 mm at the exit of the laser 110 and provide a beam of about 0.5 mm diameter, where it impinges on the cylindrical surface segment 142 of the cradle 140. In other embodiments, beam diameters of about 0.4 to 0.8 mm may be provided at the cylindrical surface segment 142. Other beam diameters also may be provided.

In some embodiments, the three beam steering mirrors 282, 284, 286 may be fixed beam steering mirrors. However, in other embodiments of the present invention, the final beam steering mirror 286 that impinges the pulsed laser beam 112 onto the rotating polygon mirror 120 may be a movable mirror that is configured to at least partially compensate for imperfections in the rotating polygon mirror 120 and/or in the rotation thereof about its axis of rotation, shown by arrow 124. In some embodiments, the movable mirror 286 may comprise an electronically controlled Fast-Steering Mirror (FSM) that can be used to compensate for mechanical imperfections in the rotating polygon mirror 120, the motor 220 and/or other mechanical imperfections that may result in errors in the laser beam placement. Fast-steering mirrors are well known to those having skill in the art, and need not be described further herein. In some embodiments, a Model FSM-300 fast-steering mirror, marketed by Newport Corporation, may be used.

In some embodiments, the fast-steering mirror 286 may be controlled by mapping out the imperfections in the rotating polygon mirror 120, the motor 220 and/or other components, and creating and storing a compensating X-Y actuation for the fast-steering mirror 286 as a function of the rotation 124. The stored X-Y actuation is then used to govern movement of the fast-steering mirror. In other embodiments, compensation may be performed in real time using a feedback mechanism, using techniques that are well known to those having skill in the art. It has been found that, according to some embodiments of the invention, the addition of a fast-steering mirror 286 can improve the accuracy of placement of the beam 112 on the cylindrical surface segment 142 of the cradle 140 by up to an order of magnitude or more.

It will be understood that many other configurations of optical trains may be provided, which need not use all of the elements illustrated in FIG. 2. Moreover, additional optical elements may be provided. For example, a vacuum spatial filter, a top hat filter and/or a diffuser screen may be provided, as described in copending application Ser. No. 11/382,163, filed May 8, 2006, to Gardner et al., entitled Methods and Apparatus for Processing a Pulsed Laser Beam to Create Apertures Through Microlens Arrays, and Products Produced Thereby, assigned to the assignee of the present application, the disclosure of which is hereby incorporated herein by reference in its entirety as if set forth fully herein. Finally, it will be understood that FIG. 2 also illustrates analogous method embodiments of the present invention.

Figure 3:
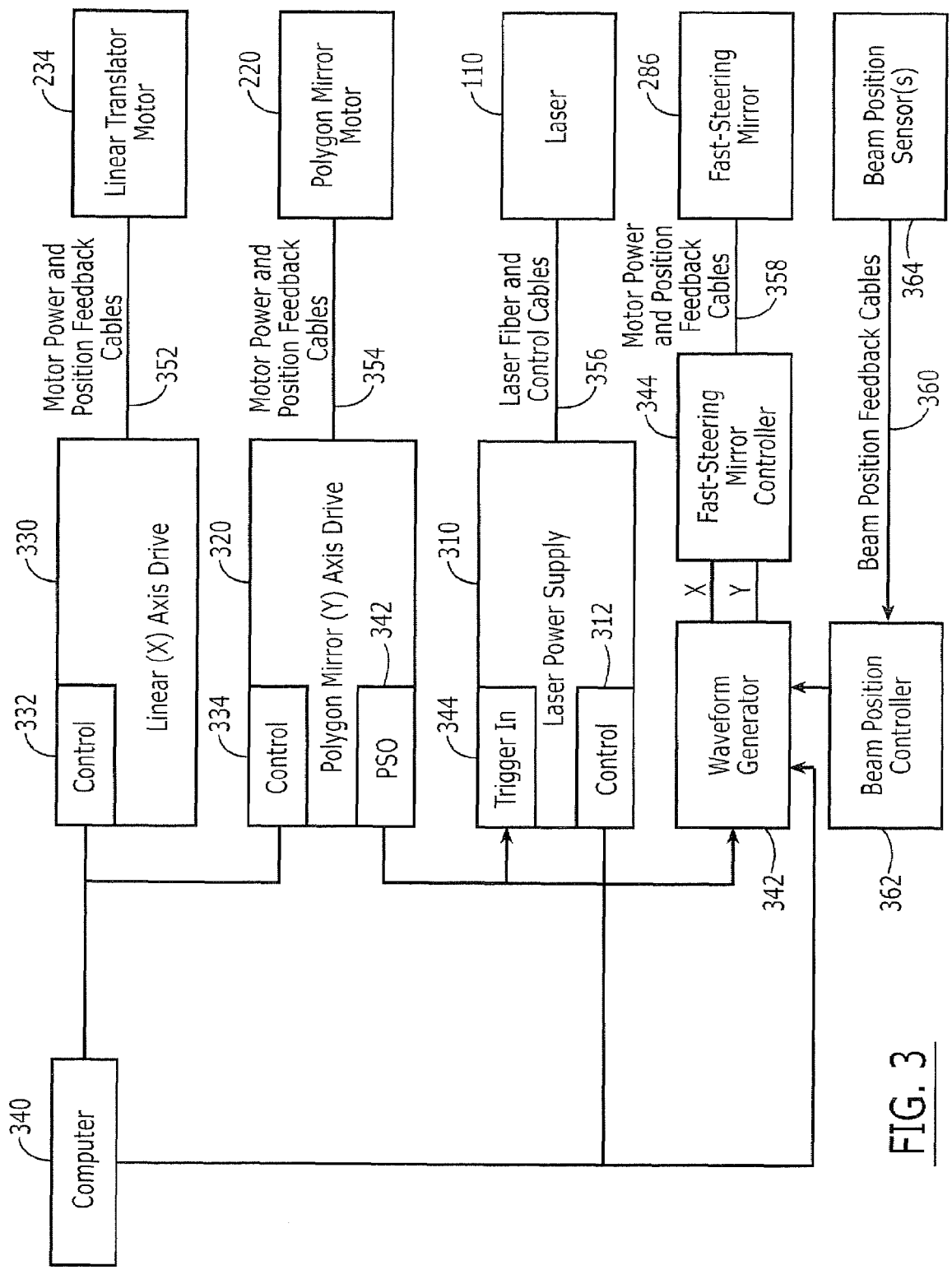
FIG. 3 is a block diagram of control systems and methods that may be used to control the apparatus/methods of FIGS. 1 and/or 2.

FIG. 3 is a block diagram of a controller according to some embodiments of the present invention, that is configured to simultaneously control the pulsing of the pulsed laser 110, the rotation of the polygon mirror via the polygon mirror motor 220 and the translation of the polygon mirror 120 via the linear translator motor 234. As shown in FIG. 3, a computer 340 is used to control the linear (X) axis drive 330 as shown by arrow 238, the polygon mirror (Y) axis drive 320 as shown by arrow 124, and a power supply 310 for the laser 110. The power and/or pulse frequency of the laser may be controlled. As also shown in FIG. 3, the computer 340 may interface with a control module 332 of the linear axis drive 330, a control module 334 of the polygon mirror drive 320 and a control module 312 of the laser power supply 310. Moreover, a Position Synchronized Output (PSO) 342 from the polygon mirror drive 320 may be used to trigger a trigger input 344 of the laser power supply 310. Various cables 352, 354 and 356 may be used to interface the drivers 310, 320 and 330 to the devices 110, 220 and 234.

As also illustrated in FIG. 3, when a fast-steering mirror 286 is used, the computer 340 may be used to control a waveform generator 342 that generates X-Y steering voltages that are applied to a fast-steering mirror controller 344. The fast-steering mirror controller 344 controls the fast-steering mirror 286 via appropriate cables 358. The waveform generator 342 may also be responsive to a beam position controller 362, which is connected to one or more beam position sensors 364 in the optical train 260, via beam position feedback cables 360. As also shown in FIG. 3, the position of the fast-steering mirror 286 may be controlled by independent X and Y voltages, which are delivered by the waveform generator 342 in synchronization with the polygon mirror motion. The synchronization may be accomplished using the Position Synchronized Output (PSO) 342 of the polygon mirror motor controller 320. Accordingly, the fast-steering mirror can at least partially compensate for wobble and/or other imperfections in the polygon mirror motor 220 and/or in the polygon mirror 120 itself.

In some embodiments of the present invention, the controller of FIG. 3 may be used to pulse the laser at about 100 kHz, and to provide a pulse of about 1.3 mm diameter at the exit of the laser and a diameter of about 0.5 mm at the cylindrical surface segment 142. Moreover, the laser linear translator motor 234 and polygon mirror motor 220 may be controlled to provide about 0.12 mm overlap in both the circumferential and axial directions. In some embodiments, a given spot (laser pulse) may image 30-40 lenses, with 10-15 of these lenses being previously unexposed, so that about 1 million-1.5 million microlenses per second may be imaged. A 50" diagonal substrate may, therefore, be processed in about four minutes. High throughput may thereby be obtained while providing substantially aligned apertures throughout the substrate.

Figure 4:
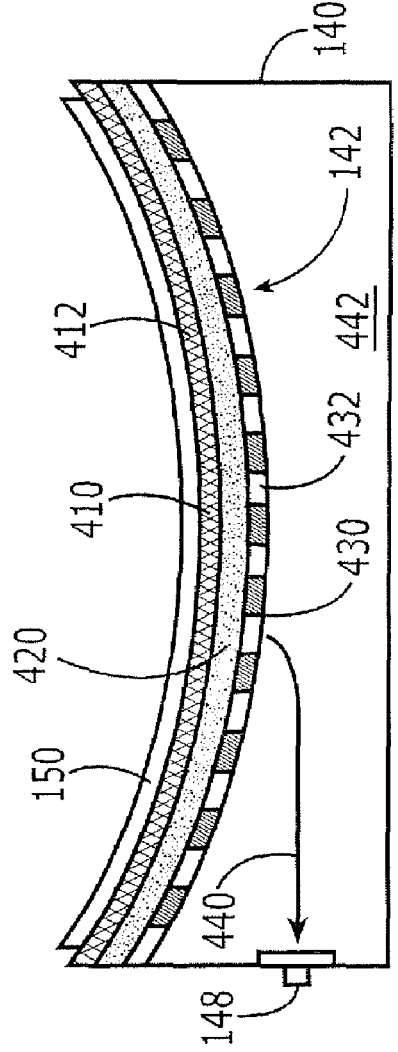
FIG. 4 is a cross-sectional view of a cradle including a cylindrical surface segment according to some embodiments of the present invention.

FIG. 4 is a cross-sectional view of cradles 140 of FIGS. 1 and 2 according to various embodiments of the present invention. It will be understood by those having skill in the art that the size and relative sizes of the layers in the cylindrical surface segment 142 have been exaggerated for clarity, and FIG. 4 is not drawn to scale.

More specifically, as shown in FIG. 4, a cradle 140 according to some embodiments of the present invention includes a cylindrical surface segment 142. The cylindrical surface segment 142 includes a rigid support layer 430 including perforations 432 therein. The rigid support layer 430 may be embodied as a curved perforated sheet metal sheet, such as a perforated steel sheet. The perforated steel sheet can maintain its shape and the perforations allow a vacuum to be pulled therethrough from vacuum port 148, through a vacuum plenum 442 as shown by arrow 440.

Still continuing with the description of FIG. 4, a flexible porous buffer layer 420, such as a one inch thick open cell foam layer, is provided on the rigid support layer 430, between the rigid support layer 430 and the axis 144. The buffer layer 420 is also porous, so that vacuum can be pulled therethrough. The buffer layer 420 can reduce or eliminate the perforations 432 in the rigid support layer 430 from being impressed onto a lens sheet 150 that is mounted on the cylindrical surface segment 142.

Finally, a flexible porous support layer 410 is provided on the flexible porous buffer layer 420, between the flexible porous buffer layer 420 and the axis 144. In some embodiments, the flexible porous support layer 410 may comprise fiberglass mesh screen with, for example, 60 threads 412 per inch. The fiberglass screen 410 can provide a relatively low friction support surface for a lens sheet 150 that is mounted thereon, and can allow some expansion and contraction of the lens sheet as the laser impinges thereon. Moreover, hold down vacuum can be pulled therethrough. Finally, as was described above, a slot may be provided in the cradle 140, in the plane of FIG. 4, that may extend through the rigid support layer 430, the flexible porous buffer layer 420 and/or the flexible porous support layer 410 to allow debris to be exhausted, for example through the vacuum plenum 442 and vacuum port 148.

Accordingly, as shown in FIG. 4, in some embodiments of the present invention, the cylindrical surface segment 142 can comprise a perforated metal sheet 430, a foam layer 420 on the perforated metal sheet 430 and a flexible sheet 410 on the foam layer 420. The body of the cradle 140 can provide the vacuum plenum 442 that is configured to pull vacuum through the perforations 432 in the perforated metal sheet 430, through the foam layer 420 and through the flexible screen 410, as indicated by arrow 440, to hold the lens sheet 150 on the cylindrical surface segment 142.

Figure 5:
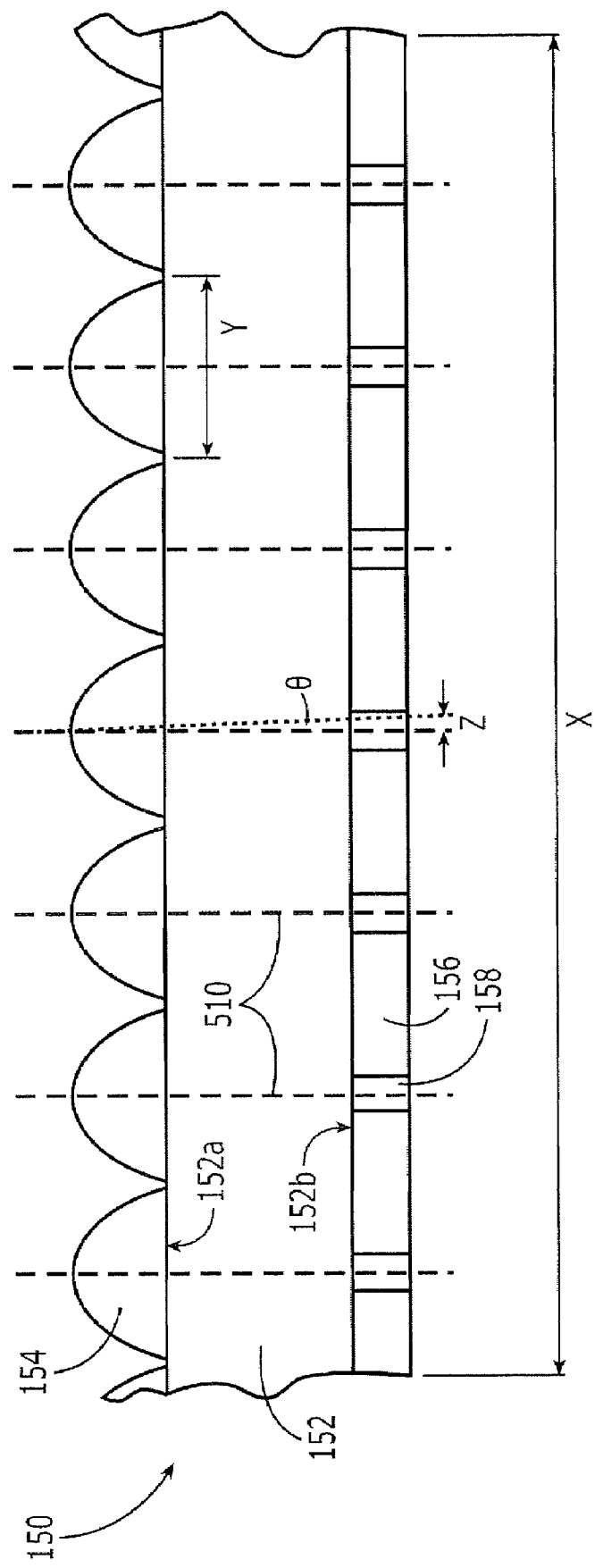
FIG. 5 is a cross-sectional view of a microlens array product according to some embodiments of the present invention.

As was described above in connection with FIGS. 1 and 2, some embodiments of the present invention can provide for substantially orthogonal or normal impingement of a laser beam onto a large area microlens sheet. High performance microlens array products may thereby be provided. For example, as shown in FIG. 5, a microlens array product 150 according to some embodiments of the present invention includes a substrate 152, an array of microlenses 154 on a first side 152a of the substrate 152 that extend along at least one direction of the substrate (horizontal, vertical and/or diagonal) for at least 30", as shown by the designation X in FIG. 5. The microlenses 154 in the array include at least one base dimension, indicated by Y in FIG. 5, that is less than about 500 μm in size.

Continuing with the description of FIG. 5, a layer 156, such as a black layer, is provided on a second side 152b of the substrate 150. The layer 156 includes an array of apertures 158 that extend along the at least one direction of the substrate for at least 30" as also indicated by X in FIG. 5. A respective aperture 158 is substantially aligned with a respective microlens, as shown by the axial lines 510, with a deviation from alignment of less than about 0.5° in some embodiments. Stated differently, the angle θ between a misaligned aperture 158 and the axis 510 of the corresponding microlens 154, can be less than 0.5° in some embodiments. Stated another way, the axis of the apertures 158 can be offset from the axis of the microlenses 510 by less than about 2 μm in some embodiments of the present invention, across the at least one direction X of the microlens array product 150, as shown by Z in FIG. 5. Moreover, as was described above, in other embodiments, for example when random variations are present, the angle θ may be less than about 0.1°. In still other embodiments, when the variations are not random, but, rather, drift in one direction or another, or they repeat, the angle θ may be 0.05° or less, in order to reduce/avoid visible defects. High performance microlens array products thereby may be provided.

In any or all of the embodiments of FIGS. 1-5, the pulsed laser beam may be a pulsed laser beam having longer wavelength than visible light, such as a pulsed infrared laser beam. However, in other embodiments, pulsed visible laser beams or pulsed laser beams having shorter wavelengths than visible light, such as pulsed ultraviolet laser beams, may be used.

Additional discussion of embodiments of the present invention that were described above in connection with FIGS. 1-5, and of other embodiments of the present invention, will now be provided. Operating parameters of some specific embodiments of the present invention also will be provided.

Processes and apparatus have been developed, according to various embodiments of the present invention, to enable the formation of self-aligned apertures opposite a lens, lens arrays and/or other optical elements. The processes, equipment and/or articles (lens sheets) that result can enable aperture formation in a controlled fashion, where the location, the shape, the size, the edge detail, number of apertures per lens, the length of aperture and/or other parameters may be controlled. The formation of these apertures in combination with organic, inorganic, reflective, absorptive and/or other optically active and/or optically neutral films can provide light, electronic and/or other management films.

Where the optical element or lens 154 has coated on the opposite side of the lens a layer 156 (also referred to as a thin film or simply as a film), that film 156 will become ablated, removed, vaporized and/or destroyed in the presence of the generally focused beam. The shape (round, square, elongated) and character (sharp, rough edges) of this removal may depend to a great extent upon the lens shape and its impact on creating an area of focus for the beamlets that form or are created by the lens array 154, and/or the energy deployed to execute this removal. The hole or aperture 158 (in terms of its shape and/or appearance of its edges) created, may be generally dictated by the optical characteristics of the lens 154, and this aperture 158 can be altered in shape and character by additional techniques beyond that dictated by the lens shape.

Additionally, for applications where the apertures 158 are used as part of a spatial filter function, such as applications for many light management functions, the size of the apertures 158 relative to the application may be determined to reduce or avoid light cutting (blockage of part of the light by the edge of the film 156) or light loss at the edges of the apertures 158. Lost light may be produced when the aperture created is not sufficiently large to allow for the full passage of light that is directed through the lens 154 to the layer 156. Conventionally, some aberration in the lens 154 or light directed from angles may not have provided enough energy during aperture creation to enable the apertures 158 to be sized correctly in a process that does not have these added methods of control. According to some embodiments of the invention, the wavelength of the laser may be used to alter the aperture opening.

The angle of the incident beam and/or multiple beams also may be used to modify the aperture opening.

High-speed aperture creation also may be desirable to provide for widespread commercialization. The uniformity of ablation may be provided via use of a pulsed beam 152 with a pulse width of, for example, less than about 30 ns. The resulting peak optical power density may be tens of mega joules (mJ) per $cm^2$.

In some embodiments, the high peak power of a Q-switched Nd:YAG laser 110, such as a Spectra Physics Quanta Ray Pro Series 350 laser, is deployed. The power of a Q-switched system is commonly known to build up over about 200 ms and is released into a pulse width of less than about 10 ns to yield a peak optical power of tens of megawatts.

In applications where a conventional black material, also simply referred to herein as "black," is used, the black layer may become the only source of black color for visible applications. In particular, to create black pixels on rear projection, plasma, liquid crystal displays, and other related applications, the display generating technology may not create black in the image. Rather, black in an image may be created by the use of some type of black matrix, usually deployed in the light path. When the light is extinguished from a pixel, the black matrix is observed. If no black matrix material is used then a viewer might see grey or metallic colors that are used in the display generating technology and are also reflective. The contrast may be reduced or minimal and the reflection of ambient light may cause the washout of images created on the surface by the image engine.

Accordingly, it may be desirable to provide a black matrix that can efficiently transmit light through the black matrix and allow a relatively large amount of black to be present, to provide an ambient light rejection layer to aid in the formation of contrast. In general, the larger the amount of black on the surface, the greater may be the ability to reject ambient light, image washout and the greater may be the contrast. Stated differently, contrast may be infinite in a dark room, but without the black, there may be little contrast in a room with lights. Therefore, the black material can help provide a desired contrast. Similarly, where the film is reflective or a combination of reflective and antireflective, the film can provide functionality by interaction with the transmitted light and/or for other electronic or dielectric applications.

Accordingly, it may be desirable to provide apertures having (1) a desired shape, which can impact the ability to provide desired spatial filter functionality; (2) a desired size relative to the shape and character of the focus or the application and use of the film; (3) a desired density of apertures about each lens and/or (4) a desired alignment relative to the corresponding lens. Desired shape, size, density and/or alignment may be provided, according to some embodiments of the invention. Constant shape, size, density and/or alignment of apertures may be provided across some microlens products in some embodiments. In these embodiments, the cradle 140 may include a cylindrical surface segment. The pulsed laser beam remains substantially normal (orthogonal) to the cylindrical surface segment. Stated differently, the radius of the pulsed laser beam from the axis 144 to the cylindrical surface segment 142 may remain substantially constant along the entire scan. Moreover, variable shape, size, density and/or alignment may be provided in other embodiments. In these embodiments, where variable shape, size, density and/or alignment is desirable, the cylindrical surface segment 142 may be replaced by a concave surface that is not a cylindrical surface segment, wherein the radius of curvature of the concave surface and/or the angle of impingement thereon, can vary with position, to provide the desired variable shape, size, density and/or alignment.

Moreover, other embodiments may provide a concave surface that is not a cylindrical surface segment or may even provide a flat surface. In these embodiments, substantially orthogonal impingement of the laser pulses on the surface may be provided using lenses and/or other optical elements to maintain the pulsed laser beam orthogonal to the scanned surface over a wide distance. For example, an f-Theta lens may be used in conjunction with a concave surface that is not a cylindrical surface segment or even with a flat surface, while still allowing orthogonal impingement. As well known to those having skill in art, f-Theta lenses are commonly used in scanning systems for reading or printing documents that are designed such that the image height is proportional to the scan angle θ, rather than the tangent of the angle, as is typically the case.

Moreover, embodiments of the invention have been described herein primarily with respect to rectangular substrates that are placed on a cradle. However, other polygonal and/or ellipsoidal shaped substrates may be used. Moreover, in other embodiments of the present invention, continuous (web) substrates may be used and moved across the cradle in a stepwise and/or continuous manner, to image a continuous film. The continuous film may then be cut into desired shapes for end products.

EXAMPLE

The following Example shall be regarded as merely illustrative and shall not be construed as limiting the invention.

A cradle 140 was constructed having a cylindrical surface segment 142 that is 53" long axially and 36" long circumferentially, with a radius of curvature of 19.1". The cylindrical surface segment 142 included a perforated steel plate 430 that is 14 gauge thick, with an array of 0.25" size apertures 432 therein, at a pitch of 5/16" (staggered). One inch thick polycarbonate open cell foam 420, such as marketed by Uline, was used, as was a conventional fiberglass mesh screen 410, having 60 threads per inch. A Model H.I.P.P.O. J80-H10-106QW laser 110, marketed by Spectra Physics, was used at a pulse frequency of 140,000 pulses/second and a pulse energy of 0.14 mJ. The beam 112 emerging from the laser 110 was 0.6 mm in diameter, and the optical train 260 provided a beam of 0.5 mm diameter to impinge on the cylindrical surface segment 142. A Model FSM-300 Fast-Steering Mirror (FSM) 286, marketed by Newport Corporation, was used. A 10-sided polygon mirror 120 was provided, with a polygon side of 0.812" and rotating at a constant angular velocity of 6000 rpm. A single scan or raster of a microlens array sheet was, therefore, accomplished in 1 millisecond. A Model HL31HDMB linear translator 130, marketed by Techno-Isel, translated a slider 236 at a rate of 4.5" per minute.

These embodiments were able to image a microlens array sheet of size 50"×30", having approximately 1 billion aspherical microlenses (for example, 131,665 70 μm lenses/ square inch) in approximately 9 minutes. Upon inspection, no visible defects were seen.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. Apparatus for creating apertures in a layer on a back side of a substrate that includes a microlens array on a front side thereof, the apparatus comprising:

a cradle including a cylindrical surface segment that defines an axis, wherein the cylindrical surface segment is configured to hold the layer on the back side of the substrate against the cylindrical surface segment so that the microlens array on the front side of the substrate faces the axis;

a scanning mirror;
a pulsed laser that is configured to impinge a pulsed laser beam on the scanning mirror, the scanning mirror being oriented relative to the cradle to scan the pulsed laser beam that impinges thereon, from the axis circumferentially along the cylindrical surface segment to pass through the microlens array on the front side of the substrate and into the layer on the back side of the substrate to create the apertures; and
a linear translator that is configured to linearly translate the cradle and/or the scanning mirror axially relative to one another so as to axially translate the pulsed laser beam that is scanned circumferentially along the cylindrical surface segment.

2. Apparatus according to claim 1 wherein the scanning mirror comprises a rotating polygon mirror that is configured to rotate about an axis of rotation that is parallel to the axis of the cylindrical surface segment.

3. Apparatus according to claim 2 wherein the rotating polygon mirror is positioned relative to the axis of the cylindrical surface segment such that the pulsed laser beam impinges on the polygon surface of the mirror at the axis of the cylindrical surface segment.

4. Apparatus according to claim 1 wherein the scanning mirror is oriented relative to the cradle to scan the pulsed laser beam from the axis circumferentially along, and normal to, the cylindrical surface segment.

5. Apparatus according to claim 1 wherein the scanning mirror is oriented relative to the cradle to scan the pulsed laser beam from the axis circumferentially along the cylindrical surface segment, with a deviation from normal to the cylindrical surface segment that is less than about 0.01°.

6. Apparatus according to claim 2 further comprising a movable mirror that is configured to impinge the pulsed laser beam from the pulsed laser onto the rotating polygon mirror, wherein the movable mirror is configured to at least partially compensate for imperfections in the rotating polygon mirror and/or in the rotation thereof about the axis of rotation.

7. Apparatus according to claim 6 wherein the movable mirror comprises a fast-steering mirror.

8. Apparatus according to claim 1 wherein the linear translator comprises a screw drive that is configured to translate the scanning mirror axially relative to the cradle.

9. Apparatus according to claim 1 wherein the cylindrical surface segment comprises:
a rigid support layer including perforations therein;
a flexible porous buffer layer on the rigid support layer, between the rigid support layer and the axis; and
a flexible porous support layer on the flexible porous buffer layer, between the flexible porous buffer layer and the axis.

10. Apparatus according to claim 7 wherein the flexible porous support layer is configured to support the back side of a substrate and wherein the cradle further comprises a vacuum plenum that is configured to pull vacuum through the perforations in the flexible porous support layer, through the flexible porous buffer layer and through the rigid support layer, to hold the back side of the substrate on the flexible porous support layer.

11. Apparatus according to claim 1 wherein the cylindrical surface segment comprises:
a perforated metal sheet;
a foam layer on the perforated metal sheet, between the perforated metal sheet and the axis; and
a flexible screen on the foam layer, between the foam layer and the axis.

12. Apparatus according to claim 9 wherein the flexible screen is configured to support the back side of a substrate and wherein the cradle further comprises a vacuum plenum that is configured to pull vacuum through the flexible screen, through the foam layer and through the perforations in the perforated metal sheet, to hold the back side of the substrate on the flexible screen.

13. Apparatus according to claim 1 further comprising a controller that is configured to simultaneously control pulsing of the pulsed laser, scanning of the scanning mirror and translating of the translator.

14. Apparatus according to claim 7 further comprising a controller that is configured to simultaneously control pulsing of the pulsed laser, scanning of the rotating polygon mirror, movement of the fast-steering mirror and translating of the translator.

15. Apparatus according to claim 1 wherein the microlenses are less than about 100 µm in size at bases thereof and wherein the pulsed laser beam is about 1 mm in diameter at the cylindrical surface segment.

16. Apparatus according to claim 1 wherein the pulsed laser, the scanning mirror and the linear translator are configured so as to overlap impingement areas of the pulsed laser beam on the cylindrical surface segment circumferentially and axially.

17. Apparatus according to claim 1 wherein the substrate that includes the microlens array on the front side thereof and the layer on the back side thereof is configured for visible light applications and wherein the pulsed laser is a pulsed laser having longer wavelength than visible light.

18. Apparatus according to claim 1 wherein the substrate that includes the microlens array on the front side thereof and the layer on the back side thereof is configured for visible light applications and wherein the pulsed laser is a pulsed infrared laser.

19. A method of creating apertures in a layer on a back side of a substrate that includes a microlens array on a front side thereof, the method comprising:
curving the substrate into a cylindrical surface segment that defines an axis, so that the microlens array on the front side of the substrate faces the axis; and
scanning a pulsed laser beam from the axis circumferentially along the cylindrical surface segment to pass through the microlens array on the front side of the substrate and into the layer on the back side of the substrate to create the apertures, while simultaneously translating the substrate and/or the scanned pulsed laser beam axially relative to one another.

20. A method according to claim 19 wherein scanning a pulsed laser beam from the axis circumferentially along the surface segment comprises rotating a polygon mirror about an axis of rotation that is parallel to the axis of the cylindrical surface segment.

21. A method according to claim 20 further comprising positioning the polygon mirror relative to the axis of the cylindrical surface segment such that the pulsed laser beam impinges on the polygon surface of the mirror at the axis of the cylindrical surface segment.

22. A method according to claim 19 wherein scanning a pulsed laser beam from the axis circumferentially is performed with a deviation from normal to the cylindrical surface segment that is less than about 0.01°.

23. A method according to claim 20 further comprising at least partially compensating for imperfections in the polygon mirror and/or the rotation thereof about the axis of rotation.

24. A method according to claim 23 wherein at least partially compensating is performed by a fast-steering mirror.

25. A method according to claim 19 wherein simultaneously translating comprises translating the scanned pulsed laser beam axially relative to the cradle.

26. A method according to claim 19 further comprising simultaneously controlling pulsing of the pulsed laser, scanning of the pulsed laser beam and translating of the substrate and/or the scanned pulsed laser beam axially relative to one another.

27. A method according to claim 23 further comprising simultaneously controlling pulsing of the pulsed laser, scanning of the pulsed laser beam, at least partially compensating for imperfections and translating of the substrate and/or the scanned pulsed laser beam axially relative to one another.

28. A method according to claim 19 wherein the microlenses are less than about 100 μm in size at bases thereof and wherein the pulsed laser beam is about 1 mm in diameter at the cylindrical surface segment.

29. A method according to claim 19 wherein the pulsed laser beam, the scanning and the simultaneously translating are controlled so as to overlap impingement areas of the pulsed laser beam on the cylindrical surface segment circumferentially and axially.

30. A cradle for holding a substrate that includes a layer on a back side thereof and a microlens array on a front side thereof, while creating apertures in the layer, the cradle comprising:
    a cylindrical surface segment that defines an axis, wherein the cylindrical surface segment is configured to hold the back side of the substrate against the cylindrical surface segment so that the microlens array on the front side of the substrate faces the axis.

31. A cradle according to claim 30 wherein the cylindrical surface segment comprises:
    a rigid support layer including perforations therein;
    a flexible porous buffer layer on the rigid support layer, between the rigid support layer and the axis; and
    a flexible porous support layer on the flexible porous buffer layer, between the flexible porous buffer layer and the axis.

32. A cradle according to claim 31 wherein the flexible porous support layer is configured to support the back side of a substrate and wherein the cradle further comprises a vacuum plenum that is configured to pull vacuum through the perforations in the flexible porous support layer, through the flexible porous buffer layer and through rigid support layer, to hold the back side of the substrate on the flexible porous support layer.

33. A cradle according to claim 30 wherein the cylindrical surface segment comprises:
    a perforated metal sheet;
    a foam layer on the perforated metal sheet, between the perforated metal sheet and the axis; and
    a flexible screen on the foam layer, between the foam layer and the axis.

34. A cradle according to claim 33 wherein the flexible screen is configured to support the back side of a substrate and wherein the cradle further comprises a vacuum plenum that is configured to pull vacuum through the flexible screen, through the foam layer and through the perforations in the perforated metal sheet, to hold the back side of the substrate on the flexible screen.

* * * * *